United States Patent
Sanfrod et al.

(10) Patent No.: US 7,036,889 B2
(45) Date of Patent: May 2, 2006

(54) AIRCRAFT PASSENGER SEAT AND IN-FLIGHT ENTERTAINMENT INTEGRATED ELECTRONICS

(75) Inventors: William C. Sanfrod, Mukilteo, WA (US); Joseph P. Condon, West Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/812,008

(22) Filed: Mar. 26, 2004

(65) Prior Publication Data

US 2004/0183346 A1    Sep. 23, 2004

Related U.S. Application Data

(62) Division of application No. 10/021,693, filed on Dec. 12, 2001, now Pat. No. 6,899,390.

(51) Int. Cl.
*B60N 2/44* (2006.01)

(52) U.S. Cl. .................................. 297/463.2

(58) Field of Classification Search ............. 297/463.2, 297/217.1, 217.4, 217.3; 725/76, 77; 244/118.5, 244/1 R; 29/429, 592.1, 745, 729
See application file for complete search history.

(56) References Cited

U.S. PATENT DOCUMENTS

| | | | |
|---|---|---|---|
| 3,019,050 A | | 1/1962 | Spielman |
| 4,072,346 A | | 2/1978 | Schueler |
| 4,509,097 A | * | 4/1985 | Robinson ............ 361/740 |
| 4,537,469 A | * | 8/1985 | Kircher ............... 385/13 |
| 5,318,340 A | | 6/1994 | Henry |
| 5,795,018 A | * | 8/1998 | Schumacher et al. .. 297/184.17 |
| 5,834,698 A | * | 11/1998 | Izui et al. ............ 174/113 R |
| 5,865,503 A | * | 2/1999 | Shields, Jr. ........... 297/188.14 |
| 5,984,415 A | | 11/1999 | Schumacher et al. |
| 6,102,476 A | | 8/2000 | May et al. |
| 6,179,381 B1 | * | 1/2001 | Gevaert ................ 297/217.3 |
| 6,199,948 B1 | | 3/2001 | Bush et al. |
| 6,249,913 B1 | | 6/2001 | Galipeau et al. |
| 6,601,798 B1 | | 8/2003 | Cawley |
| 6,634,904 B1 | | 10/2003 | Rowland et al. |
| 6,644,593 B1 | | 11/2003 | Lambiaso |
| 6,817,894 B1 | | 11/2004 | Sanner et al. |

FOREIGN PATENT DOCUMENTS

EP    0 839 713 A2    8/1997

(Continued)

OTHER PUBLICATIONS

International Search Report dated Jun. 3, 2003 bearing Application No. PCT/US 02/36678.

(Continued)

*Primary Examiner*—Milton Nelson, Jr.
(74) *Attorney, Agent, or Firm*—Harness Dickey & Pierce P.L.C.

(57) ABSTRACT

An aircraft seat assembly including at least one electronic component usable by a passenger and a single integrated electronic system which provides signal decoding, signal routing, data management, built in test, and power conversion for each user accessible electronic component which is installed in the seat assembly. The electronic components generally include at least a video display unit, an audio system, or a telephone. The integrated electronics system provides power conversion, signal routing, data management and other electronic requirements for each of the electronic components. The integrated electronics system not only integrates power conversion and signal management responsibilities into one system, but into such a system that is readily integrated into the seat assembly.

18 Claims, 1 Drawing Sheet

FOREIGN PATENT DOCUMENTS

EP            0 839 713 A3     8/1997

OTHER PUBLICATIONS

U.S. Appl. No. 10/925,627 filed Aug. 25, 2004, presently pending.
U.S. Appl. No. 10/921,553 filed Aug. 19, 2004, presently pending.
U.S. Appl. No. 10/943,035 filed Sep. 16, 2004, presently pending.
U.S. Appl. No. 10/983,906 filed Nov. 8, 2004, presently pending.
U.S. Appl. No. 10/936,004 filed Sep. 8, 2004, presently pending.
U.S. Appl. No. 10/898,729 filed Jul. 23, 2004, presently pending.
U.S. Appl. No. 10/810,324 filed Mar. 27, 2004, presently pending.
U.S. Appl. No. 60/557,044 filed Mar. 27, 2004, presently pending.
U.S. Appl. No. 60/556,826 filed Mar. 27, 2004, presently pending.
U.S. Appl. No. 60/556,748 filed Mar. 27, 2004, presently pending.
U.S. Appl. No. 10/027,948 filed Dec. 19, 2001, presently pending.
U.S. Appl. No. 09/970,274 filed Oct. 3, 2001
U.S. Appl. No. 09/998,069 filed Nov. 30, 2001.
U.S. Appl. No. 09/943,707 filed Aug. 31, 2001.
U.S. Appl. No. 09/941,497 filed Aug. 29, 2001.

* cited by examiner

AIRCRAFT PASSENGER SEAT AND IN-FLIGHT ENTERTAINMENT INTEGRATED ELECTRONICS

CROSS REFERENCE TO RELATED APPLICATIONS

The present application is a divisional of U.S. patent application Ser. No. 10/021,693, filed Dec. 21, 2001 now U.S. Pat. No. 6,899,390, presently allowed, the disclosure of which is hereby incorporated by reference into the present application.

FIELD OF THE INVENTION

The present invention relates to integrated electronics, and more particularly to integrated electronics including multiple electronic systems for aircraft seat assemblies.

BACKGROUND OF THE INVENTION

Generally, aircraft are sold to airline companies as an engine and fuselage which the particular airline companies may customize. The aircraft manufacturer generally manufactures aircraft for a wholesale or general market allowing the airlines to make additions and changes to the aircraft. Generally, airline companies install additional and supplementary elements, such as seats, In-Flight Entertainment system components, and galleys, into the aircraft after the aircraft has been completed, but before delivery. These additional elements assist or are useful to the passengers and may include newer or additional technology components. Some of these components include personal computer power outlets, phones, and the components capable of providing multiple video channel, audio channels, and data management.

Many of these components are installed into the seats themselves so that they can be accessed by passengers sitting in each seat. Currently, many seats in commercial aircraft include passenger control units, which control functions such as attendant call, a seat video display, a phone, or computer interface. Wiring bundles connect all of the seats and electronic components. The wiring bundles comprise all of the necessary electrical cabling. The wiring bundles run overhead in the aircraft down the sidewall, in a space between the sidewall and the exterior of the aircraft, and to the seats or through floor mounted junction boxes to the seats. Additional wiring also runs from seat to seat connecting the various components. Each of the components has its own seat mounted wiring, circuitry, and electronics components, such as a seat electronics box (SEB) or a seat electronics unit (SEU). Much of the wiring, however, between the main wiring and the separate components is redundant, increasing the volume and the mass of wiring which simply replicates the functions of other wiring. In many instances a separate SEB/SEU performs similar or redundant functions for each component.

These multiple boxes and redundant wiring systems increase the weight, power consumption, and the volume of space required in an aircraft for their installation. In particular, the multiple redundant boxes reduce leg room and comfort of a passenger. Most significantly, the redundant circuitry increases the weight of the aircraft thereby decreasing pay load capacity and increasing the fuel consumption of an aircraft during powered flight. Furthermore, the components increase the total cost and weight of the final seat assembly. If a component fails, repair of the component may require replacing the affected component. This is particularly cumbersome when many of the components are manufactured by various vendors requiring vast stockpiles and disparate specialized knowledge in the maintenance and/or replacement of such components.

SUMMARY OF THE INVENTION

The above drawbacks are addressed by an integrated seat assembly and method. The integrated seat assembly eliminates the multiple and redundant circuits reducing manufacturing time, costs, and weight.

A first preferred embodiment of the seat assembly comprises an integrated seat assembly having an integrated electronic assembly, adapted to be placed in an aircraft. The seat assembly has at least one seat portion. A component to be used by a passenger sitting in the seat assembly is provided. Finally, an electronic system which is integrated into the one portion of the seat assembly provides power conversion, data management, and other functions for the component.

A second preferred embodiment includes an airline seat assembly with multiple seat portions, having a plurality of electronic components to be used by a passenger. A single integrated electronics system distributes power, signal, and data management capabilities for the plurality of electronic components to be used by the passenger.

A third preferred embodiment includes a seat portion that includes at least a seat back and armrest adapted to be used by a passenger in an aircraft. A plurality of passenger usable electronic components, including a video display unit, a telephone, an audio output, and a personal computer port, incorporated within the seat portion. In addition, a single power converter to transmit power to each of the plurality of electronic components, and, a ribbon cable operably associated with the power supply including a plurality of conductors that transmit power through at least one of said plurality of conductors to the electronic components. The ribbon cable may be installed between airplane and seat, seat to seat and within the seat.

A fourth preferred embodiment includes a data processor function connecting a plurality of electronic components bi-directionally connected by fiber optic cable or a wireless interface to its data source.

Further areas of applicability of the present system and method will become apparent from the detailed description provided hereinafter. It should be understood that the detailed description and specific examples, while indicating preferred embodiments, are intended for purposes of illustration only and are not intended to limit the scope of the appended claims.

BRIEF DESCRIPTION OF THE DRAWINGS

The present system and method will become more fully understood from the detailed description and the accompanying drawings, wherein.

DETAILED DESCRIPTION OF THE PREFERRED EMBODIMENTS

Figure 1:
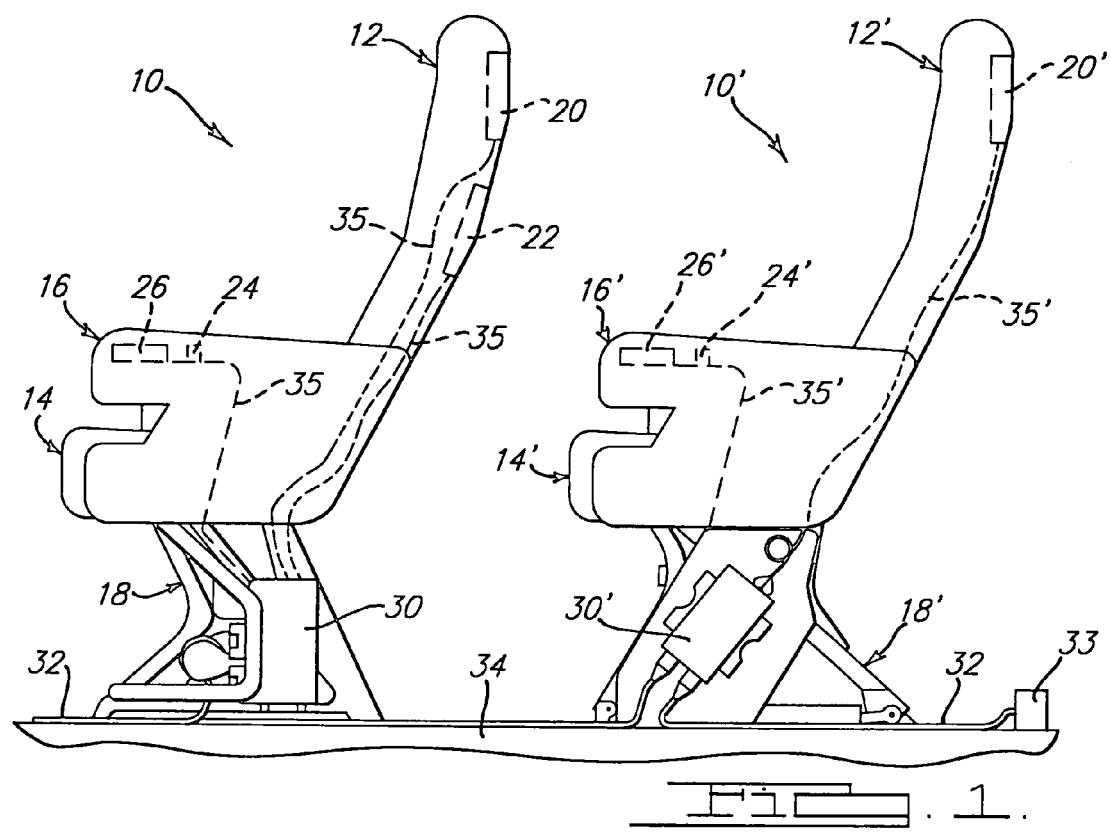
FIG. 1 is a side elevation view of a pair of prior art seat assemblies.

With reference to FIG. 1, an exemplary prior art first seat assembly 10 is shown. The first seat assembly 10 includes a seat back 12, a seat cushion 14, an arm portion 16, and a plurality of leg supports 18. The first seat assembly 10 typically includes several electronic components. The electronic components generally comprise at least a single or multi-function video display unit (VDU) 20, a telephone 22, an audio interface 24 and a personal control unit (PCU) 26. FIG. 1 shows an exemplary configuration wherein the first seat assembly 10 is in a first row followed by a second seat assembly 10' in a second row. The portions of the second seat assembly 10' that are similar to the first seat assembly 10 are indicated with the same reference numeral augmented by a prime. The POUs 26, 26' allow a passenger to control each of the electronic components included for that passenger's use. Generally, the VDU 20 on the first seat assembly 10 is controlled by the PCU 26' associated with the second seat assembly 10'. The telephone 22 on the first seat assembly 10 is available for use by the passenger seated in the second seat assembly 10'. The PCU 26', also controls the volume of the audio interface 24', and the signal being received by the VDU 20.

Each electronic component has a corresponding seat electronics box (SEB) or a seat electronics unit (SEU), housed in a box 30, that is mounted to the first seat assembly 10. The second seat assembly 10' also includes a plurality of boxes 30. Each SEB/SEU box 30, 30' is mounted to its associated leg supports 18, 18'. The SEB/SEU boxes 30', 30' are generally large and bulky in size and have exterior dimensions that are equal to a large amount of the space under the seat assemblies 10, 10'. Although the plurality of SEB/SEU boxes 30, 30' may not extend longitudinally under the entire seat assemblies 10,10', they can disrupt the ability of the passenger sitting behind the respective seat assemblies 10, 10' to position the passenger's legs comfortably or to stow carry-on baggage. Cable bundles 32 with multiple conductors extend from each SEB/SEU box 30, 30' and run along aisleway 34 and interconnect the plurality of SEB/SEU boxes 30, 30' within a seat. The cable bundles 32 carry signals and power from a signal and power source 33 to and between seat assemblies 10, 10'. These cable bundles 32 also add to the weight and bulk of the seat assemblies 10, 10' and decrease the passenger-usable space inside the cabin of the aircraft and may decrease the performance reliability of the electronic components. Additional conductors 35 carry the signal or power from each SEB/SEU box 30,30' to each of the electronic components.

Generally, the SEB/SEU boxes 30, 30' are line replaceable units (LRU). A LRU is a portion of a component which may be easily removed and replaced to ensure proper functioning of the component. Each seat component such as the VDU 20, and telephone 22, has its own SEB/SEU box 30. The SEB/SEU boxes 30, 30' are LRUs so that if at any time a component no longer works and the problem can be isolated to the SEB/SEU box 30, 30', then the SEB/SEU box can be replaced. Since each component requires its own SEB/SEU box 30, 30', there is a redundancy of such SEB/SEU 30, 30' box circuitry and the associated wiring. Generally, each SEB/SEU box 30, 30' will perform at least one of the following: power conversion, information management, signal routing and data management. Each SEB/SEU 30, 30' box is unique to the component to which it is connected. For example, if a SEB/SEU box 30, 30' is connected to a VDU 20, 20', then the SEB/SEU box 30, 30' transfers power to the VDU 20, 20', provides a signal decoder for the VDU 20, 20' and also interconnects the PCU 26, 26' with the respective VDU 20, 20'. The redundancy of the SEB/SEU boxes 30, 30' also produces additional heat and draws redundant power.

Figure 2:
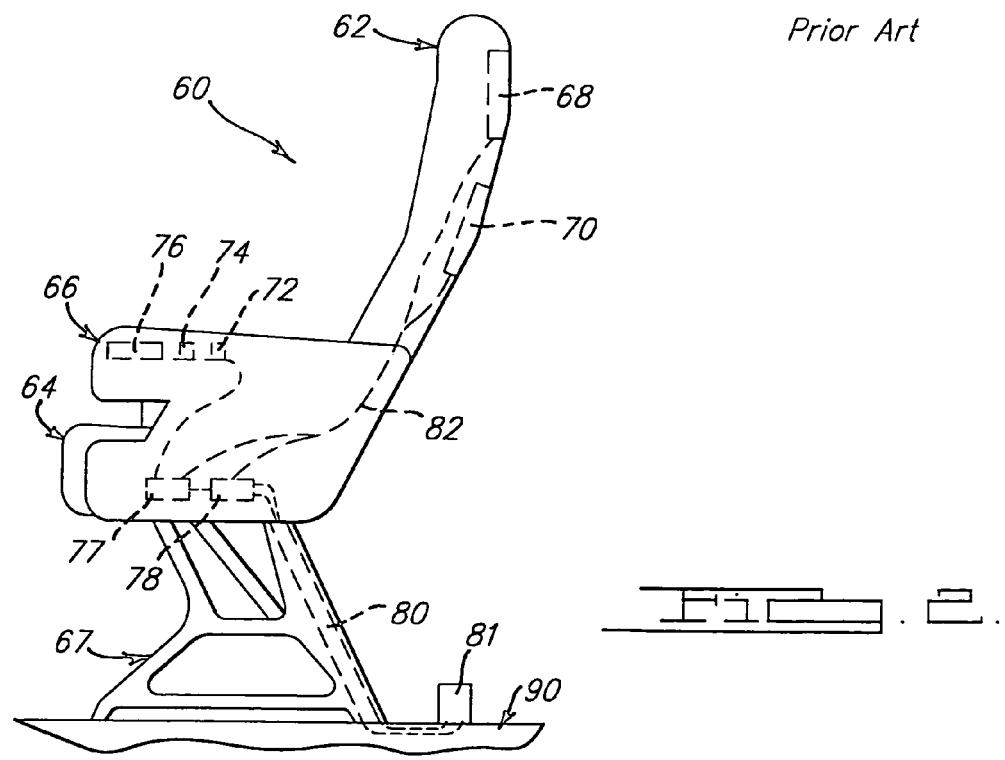
FIG. 2 is a side elevation view of an integrated aircraft seat assembly according to the present system and method.

With reference to FIG. 2, an integrated seat assembly 60 in accordance with a preferred embodiment of the present system is shown. The integrated seat assembly 60 includes several seat portions including a seat back 62, a seat cushion 64, and an arm portion 66. All seat portions are supported by multiple leg supports 67. The integrated seat assembly 60 also includes at least one electronic component including a VDU 68, a phone 70, an audio output 72, a computer connection 74, and/or a PCU 76. The integrated seat assembly 60 does not include other electronic boxes. Rather than providing individual components including individual SEB/SEUs 30, 30', all of the components are integrated into a universal or integrated electronics system. Therefore, all of the currently redundant SEB/SEUs 30, 30' are removed and replaced with a single or unitary integrated electronics distribution system where an integrated power converter 77 or router 78 is operably connected to all electronic components. Generally, the integrated power converter 77 or router 78 include bi-directional data flow to support a built in test function to monitor proper functioning of the electronic component. It will also be understood that the power converter and the router 78 may be LRUs to decrease maintenance time and resources.

Different preferred embodiments of the integrated electronics system will now be discussed in detail. It will be understood that transceiver and power converting operations may alternatively be integrated into the aircraft or any seat portion such as the seatback 62, the arm portion 66, or the seat cushion 64. Furthermore, the personal control unit 76 can include transceiver responsibilities for the seat or the electronic components including the VDU 68, the phone 70, the audio output 72, and the personal computer port 74. It will be understood that an aircraft will typically include a plurality of integrated seat assemblies 60. All of the electronic components of each seat assembly are interconnected, and all integrated seat assemblies 60 in the aircraft are interconnected with an interconnection system. The interconnection system is preferably selected from a wireless, fiber optic, or wire cabling system. One embodiment of the interconnection system includes a single ribbon cable 80 which carries power and a signal from a power and signal source 81 to each of the different electronic components. Different conductors 82 of ribbon cable 80 split off from the ribbon cable 80 coming from floor or aisleway 90 along the leg supports 67 to power each individual electronic component. Alternatively, the ribbon cable 80 provides power to the power converter 77 and a signal to the router 78 so that power and other signals can be transmitted to the various electronic components. Therefore, the single ribbon cable 80 provides power to each of the electronic components installed in integrated seat assembly 60. This reduces the overall size and weight of the integrated seat assembly 60.

The only cable extending into the integrated seat assembly 60 is the ribbon cable 80 which provides power to the separate components. It will be understood that ribbon cable 80 may also carry a signal to each seat component or may provide only power to wireless components. The ribbon cable 80 has a very low profile (i.e., is very flat and thin) and may be easily concealed under carpeting in the aisleway 90 and concealed in the cushioning of the integrated seat assembly 60 itself. Furthermore, the ribbon cable 80 may reduce electrical noise and interference without requiring bulky electrical insulation materials to be employed.

An exemplary estimate of the weight reduction of wiring due to removal of the redundant wiring and SEB/SEUs is between about 20% and 40% on a 2000 design of a Boeing 767-400 commercial aircraft. The precise weight savings using the present invention will depend upon how many electronic components were installed in the previous seat design used by an airline company. Removal of redundant LRUs will provide a weight reduction of between about 30% and 50%. Not powering each of the additional SEB/SEU 30, 30', redundant components, and by not using additional cables, power consumption is decreased by between about 20% and 40%.

The integrated seat assembly 60 is more easily serviced and upgraded. By removing the redundant systems, fewer electronic systems are available to break, thereby reducing the likelihood of frequent servicing. Additionally, the initial installation integration of the present system into new designs is greatly reduced by not requiring multiple redundant components. Therefore, initial production and installation costs are reduced. This design concept further reduces the number of connectors in the electronic components, thereby increasing the reliability of the system.

The above description is merely exemplary in nature and, thus, variations that do not depart from the gist of the system are intended to be within the scope of the amended claims.

What is claimed is:

1. A method for forming an integrated seat assembly, comprising:
   providing a seat;
   supporting from said seat a plurality of independent electronic components;
   routing a single cable having a plurality of conductors into the seat, the cable supplying power for said independent electronic components and communication capability for at least one of the electronic components; and
   using an electronics distribution system forming a portion of said seat to receive power from said cable and to supply power to each of said independent electronic components, and to interface with said one electronic component to enable communication with a subsystem located remotely from said seat.

2. The method of claim 1, wherein supporting a plurality of independent electronic components comprises supporting at least one of:
   a video display unit, a telephone and a personal control unit.

3. The method of claim 1, wherein routing a single cable comprises routing a ribbon cable having a plurality of conductors into said seat.

4. A method for forming an integrated seat assembly, comprising:
   providing a seat;
   supporting from said seat a plurality of independent electronic components;
   routing a single cable having a plurality of conductors into said seat;
   using a selected first one of said conductors to directly supply power to at least one of said independent electronic components, and a second one of said conductors to interface with one of said independent electronic components; and
   interfacing said cable with a distribution subsystem supported from said seat; and
   using said distribution subsystem to supply signals to at least one of said independent electronic components and power to at least one of said independent electronic components.

5. The method of claim 4, further comprising interfacing said distribution subsystem with a telephone.

6. The method of claim 4, wherein using said cable comprises using a ribbon cable.

7. The method of claim 4, wherein supporting a plurality of independent electronic components comprises supporting a video display unit.

8. The method of claim 4, wherein supporting a plurality of independent electronic components comprises supporting a personal control unit.

9. The method of claim 4, further comprising interfacing said distribution subsystem with said independent electronic components via a fiber optic coupling.

10. The method of claim 4, further comprising interfacing said distribution subsystem with an audio interface.

11. A method for controlling electronic components located on a seat on a mobile platform, comprising:
    routing a cable having a plurality of conductors along a leg portion of said seat;
    interfacing said cable with a distribution subsystem supported by said seat; and
    interfacing said distribution subsystem with a plurality of independent electronic components to provide power to at least one of said electronic components and communication capability to at least one of said electronic components.

12. The method of claim 11, further comprising interfacing said distribution subsystem with a telephone.

13. The method of claim 11, further comprising locating said distribution subsystem 11, adjacent a seat portion of said seat.

14. The method of claim 11, further comprising using said distribution subsystem to provide signals to at least one of said electronic components.

15. The method of claim 11, wherein routing a cable comprises routing a ribbon cable.

16. The method of claim 11, wherein supplying power comprises supplying power to a video display unit.

17. The method of claim 11, wherein supplying power comprises supplying power to a personal control unit.

18. The method of claim 11, further comprising interfacing said distribution subsystem with an audio interface.

* * * * *